United States Patent [19]

Iwata et al.

[11] Patent Number: 4,734,780
[45] Date of Patent: Mar. 29, 1988

[54] HIGH SPEED FACSIMILE COMMUNICATION SYSTEM

[75] Inventors: Yoshitaka Iwata, Yokohama; Kunihiro Sakata, Miura; Shuichi Hirano, Yokohama, all of Japan

[73] Assignee: Hitachi, Ltd., Tokyo, Japan

[21] Appl. No.: 863,502

[22] Filed: May 15, 1986

[30] Foreign Application Priority Data

May 17, 1985 [JP] Japan .................................. 60-104065

[51] Int. Cl.$^4$ ............................................... H04N 1/32
[52] U.S. Cl. ........................................ 358/257; 375/13
[58] Field of Search ........................... 358/257; 375/13

[56] References Cited
U.S. PATENT DOCUMENTS
4,606,044 8/1986 Kudo ...................................... 375/13

Primary Examiner—Edward L. Coles, Sr.
Attorney, Agent, or Firm—Antonelli, Terry & Wands

[57] ABSTRACT

A high-speed G3 facsimile communication system for shortening the time required for procedure control performed before transmission of image data is started, a quiescent time intervening between the connection of a receiver equipment to the transmission line and the starting of sending the control procedure signal CED is utilized for sending out a newly provided procedure shortening signal to the receiver equipment, and upon receiving a response of the receiver equipment indicating that the receiver is capable of communicating in an optional mode other than G3 mode, the sender station sends subsequently the requisite control procedure signal from the high-speed modem thereof.

3 Claims, 5 Drawing Figures ced station in the high-speed G3
HIGH SPEED FACSIMILE COMMUNICATION SYSTEM

BACKGROUND OF THE INVENTION

1. Field of the Invention

The present invention generally relates to a communication method, and more particularly to a high speed facsimile communication system capable of decreasing the time required for communication.

2. Description of the Prior Art

Recently, with development of advanced equipment for office automation, there has arisen a demand for increasing the information transmission speed of a facsimile communication system, or the like. In the field of the facsimile equipment, various approaches have been made for speeding up the data transmitting operation of a modem by improving the data encoding scheme so that the rate of data compression can be increased.

In this connection, the control procedure of the facsimile has heretofore been executed so as to comply with the CCITT T30 Standards. In that case, it takes about 13 seconds from connection to the transmission line to start of actual data transmission.

On the other hand, the time required for transmission of data of an amount normally included in a document of A4 size, for example, is decreased from about 20 seconds to about 10 seconds as a result of improvement of the encoding scheme and the speeding-up of transmission as mentioned above. In otherwords, the total time required for sending a sheet of document of A4 size through the facsimile communication system is reduced to about 23 seconds, wherein about 50% thereof will be consumed for executing the control procedure. Thus the time required for the control procedure is relatively long as compared with the net time taken for the actual data transmission which is the intrinsic function of the facsimile system. This means that the reduction of total transmission time is not large even though the net time taken for actual transmission of image data or information is considerably reduced, because of a relatively long time required for the execution of the control procedure.

Parenthetically, it should be mentioned that the control procedure for the high-speed G3 facsimile system is described in detail in the CCITT T30 Standards.

SUMMARY OF THE INVENTION

It is therefore an object of the present invention to provide a high-speed facsimile communication system in which the time required for execution of the control procedure to be carried out prior to starting of the actual image data transmission can be significantly reduced.

In view of the above object, it is proposed according to the present invention that a newly provided procedure shortening signal is sent to an addressed receiver station during a quiescent time interval from connection of the receiver station to the transmission line to starting of sending the control procedure signal (CED). When a response of the receiver station indicating that communication is possible in an optional mode other than the G3 mode is received, then the sender station sends subsequently the control procedure signals through a high-speed modem.

DESCRIPTION OF THE PREFERRED EMBODIMENTS

Figure 1:
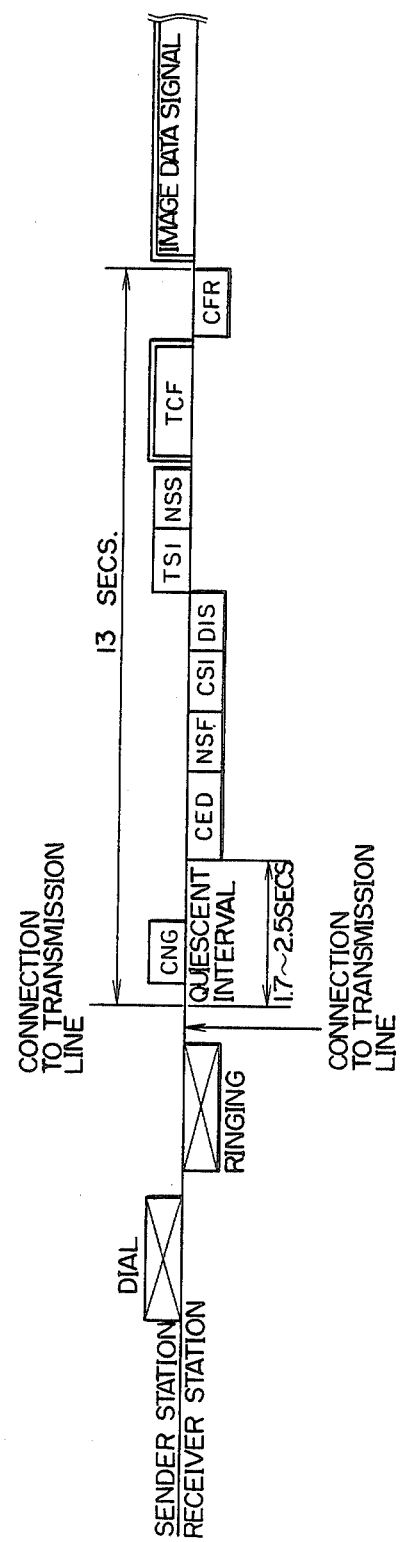
FIG. 1 is a view showing a hitherto known control procedure of a high-speed G3 facsimile system.

According to the CCITT T30 Standards, the control procedure which takes place between the connection to the transmission line and the starting of transmission of the image information or data includes sending various control signals listed in the following table in the sequence illustrated in FIG. 1.

TABLE

| SYMBOL | CONTENTS |
|---|---|
| CED | Called station identifying signal (tonal) |
| CNG | Calling station identifying signal (tonal) |
| DIS | Distal identification signal |
| TSI | Sender station identifying signal |
| CSI | Called station identifying signal |
| DCS | Digital command signal |
| TCF | Training check signal |
| CFR | Reception-ready confirmation signal |
| NSF | Nonstandard equipment signal |
| NSS | Nonstandard equipment setting signal |

According to the CCITT recommendation, the modulation type of the high-speed modem employed in the facsimile equipment should be QAM or PHM and the transmission rate thereof should be 9600 bps, 7200 bps or 2400 bps. On the other hand, the modulation type of the low-speed modem should be FSK while the transmission rate thereof should be 300 bps.

Transmission of the various control signals mentioned above is performed through the low-speed modem at the rate of 300 bps except for the transmission of the TCF signal. Referring to FIG. 1, it will be seen that in the case of the hitherto known system, a quiescent time interval of 1.7 to 2.5 seconds exists between the line connection of the receiver equipment and the sending of the control procedure signal CED.

According to the present invention, a procedure shortening command signal (hereinafter referred to as HUC signal in abbreviation) newly provided by the invention, in addition to the control procedure signal CNG, are subsequently sent out from the sender station during the quiescent time. The procedure shortening command signal is a nonstandard signal which is not based on the CCITT T30 Standards and has a frame structure of HDLC adapted to be sent out from the low-speed modem. More specifically, the command HUC is based on the framing of HDLC recommended by the CCITT Recommendation T30 and includes subframes FIF and FCF having respective proper bit arrays. By way of example, the sub-frame FCF has entered therein a value Hex-45 indicating the type of the command or more specifically indicating that it is a nonstandard command which does not comply with the CCITT Recommendation T30. The sub-frame FIF contains functional information required for shortening the procedure control described below. This information includes data designating the transmission rate.

Figure 2:
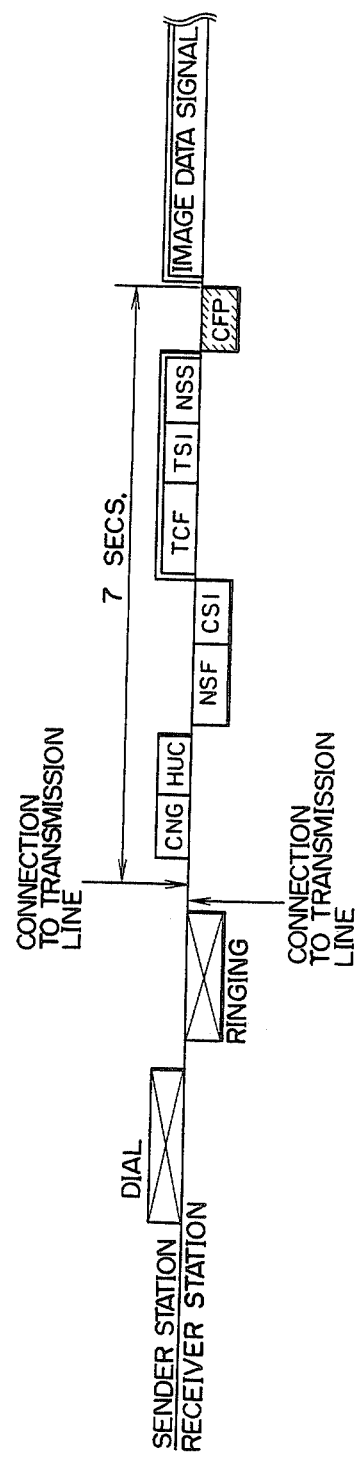
FIG. 2 is a view illustrating the control procedure of a high-speed G3 facsimile communication system according to an embodiment of the present invention.
Figure 3:
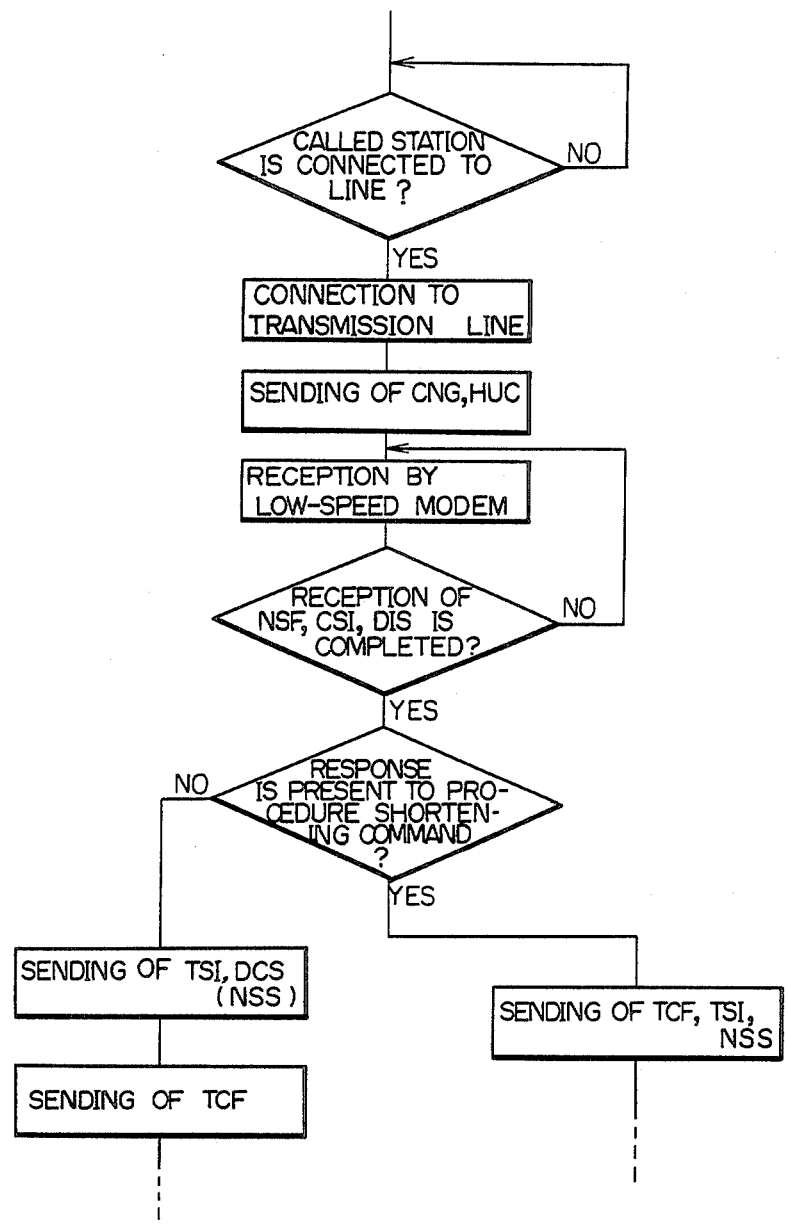
FIG. 3 is a view illustrating in a flow chart a processing executed at a sender station in the high-speed G3 facsimile communication system according to an embodiment of the present invention.
Figure 4:
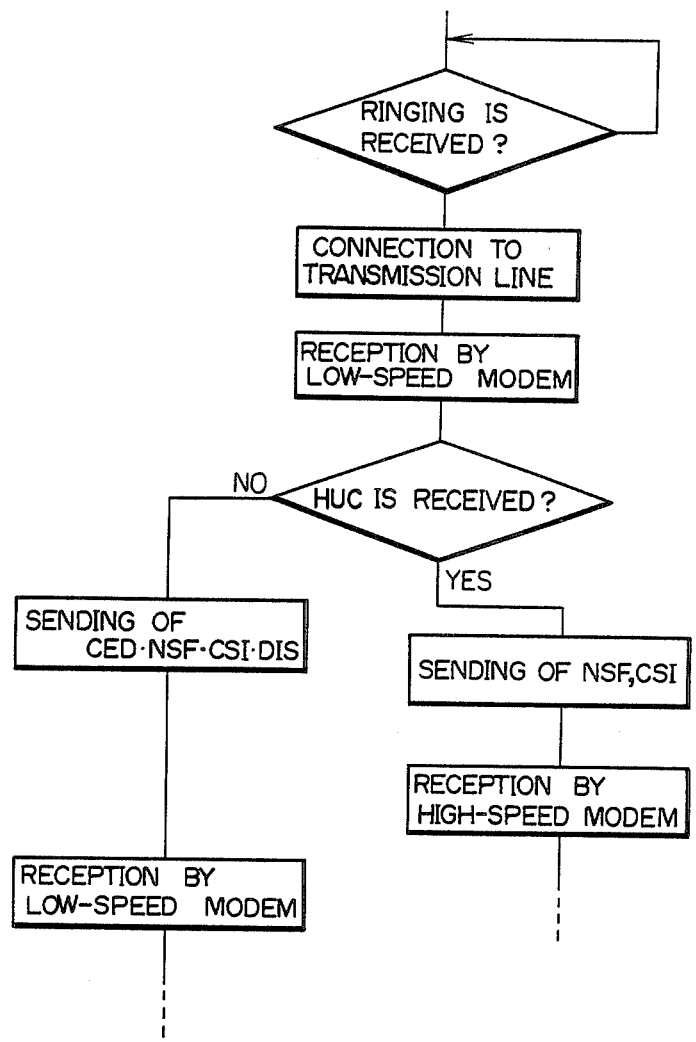
FIG. 4 is a view illustrating in a flow chart a procedure performed at a receiver station in the high-speed G3 facsimile system according to an embodiment of the invention.

FIG. 2 is a view illustrating the control procedure according to an embodiment of the invention as provided in a high-speed G3 facsimile communication system, and FIGS. 3 and 4 show flow charts for illustrating the procedures in the facsimile equipments at the receiver and sender stations, respectively, of a high-speed G3 facsimile communication system according to an embodiment of the invention.

As will be seen in FIG. 4, at the receiver station, reception is performed through the low-speed modem immediately after the connection of the station to the transmission line. When the procedure shortening command HUC signal is received, it is decided that a command is issued from the sender station which requests transition to the procedure shortening control mode, whereupon initial identification signals (NSF, CSI) are sent out instead of the conventional control procedure signal CED, signaling the transition to the procedure shortening control by means of a control procedure signal NSF. In case the equipment installed at the receiving station is incapable of executing the procedure shortening control, the procedure shortening signal HUC is neglected, whereupon the conventional control procedure such as illustrated in FIG. 1 is performed.

On the other hand, the sender station responds to the control procedure signal NSF from the receiver station indicating the transition to the procedure shortening control to thereby send out the control procedure signals TCF, TSI and NSS sequentially as high-speed modem signals, as is illustrated in FIG. 3. It should be noted that these control procedure signals TSI and NSS are heretofore sent out from the low-speed modem. In contrast, they are sent out from the high-speed modem according to the present invention. As a consequence, a significant reduction in time can be accomplished. Of course, unless the receiver station responds with the transition to the procedure shortening control, the control procedure is performed in the hitherto known manner, as shown in FIG. 1.

FIG. 2 illustrates an exemplary embodiment of the control procedure in the G3 high-speed facsimile system according to the present invention. It will be seen that the time of about 13 seconds required heretofore for the control procedure can be reduced down to about 7 seconds, which means that the time required for the control procedure can be reduced as much as about 50%. In other words, a facsimile communication system which is compatible with the time reduction in the facsimile image data transmission can be realized.

Figure 5:
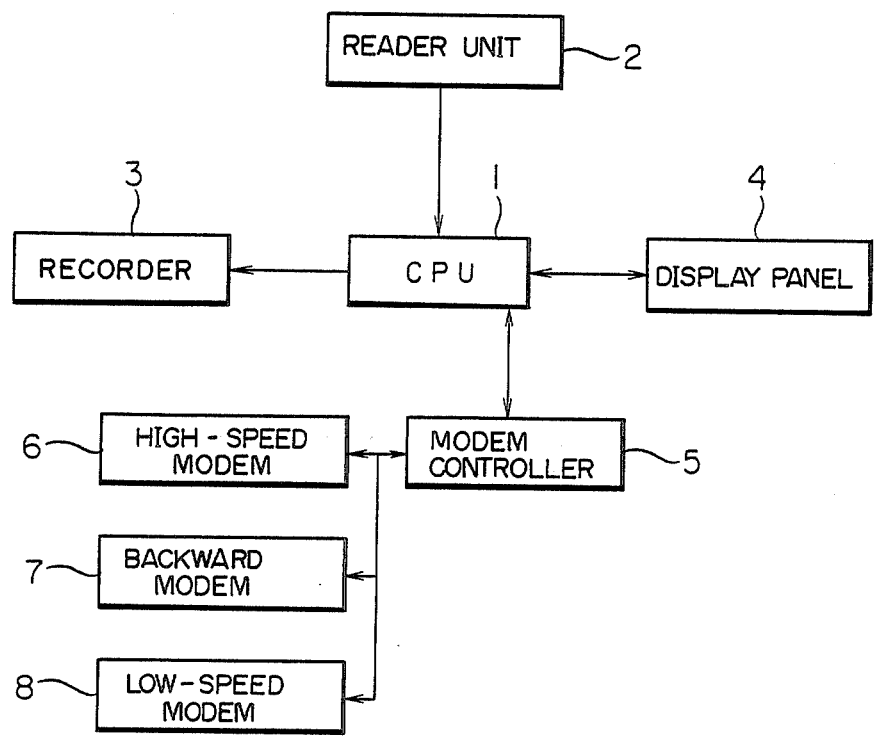
FIG. 5 is a block diagram showing a general arrangement of a high-speed G3 facsimile communication system according to the present invention.

The high-speed facsimile system for carrying out the present invention does not require any special mechanism. The invention can be implemented with a system of a conventional structure in a satisfactory manner. More particularly, referring to FIG. 5, the facsimile system for carrying out the invention may be composed of a CPU (controller) 1, a reader unit 2, a recorder 3, a display panel 4, a modem controller 5, a high-speed modem unit 6, a backward modem unit 7, and a low-speed modem unit 8 in a conventional arrangement. In other words, for realizing the high-speed facsimile communication system according to the present invention, it will be sufficient to design the function of the CPU shown in FIG. 5 so that it operates in the manner mentioned below.

The CPU 1 of a station which desires to send image data addresses first a receiver station by dialing and monitors the line connection of the addressed receiver station. Upon detection of the line connection of the receiver station, the CPU 1 commands the modem controller 5 that the signal CNG and the procedure shortening signal HUC be sent out, whereupon the sender station assumes the state ready to receive the response from the receiver station through the low-speed modem 8.

When the low-speed modem 8 receives the signals NFS and CSI as the response from the receiver station, the CPU 1 of the sender station issues a command to the high-speed modem 6 that the signals TCF, TSI and NSS be sent out. At the same time, the backward modem 7 is set to the state ready to receive the signals from the receiver station.

Upon reception of the signal CFR from the receiver station through the backward modem, the CPU 1 issues a read command to a reader unit 2 and performs the processing for coding the data as read, the coded data being sent out from the high-speed modem 6 under the command of the CPU 1.

The CPU 1 of the receiver station operates as follows. Upon detection of the ringing signal from the sender station, the CPU 1 of the receiver station commands the modem controller 5 to get ready for receiving signals through the low-speed modem 8. When the procedure shortening command signal HUC sent from the sender station is received, the CPU 1 issues a command to the modem controller 5 to the effect that the signals NSF and CSI be sent to the receiver station in response, while the high-speed modem 6 performs the receiving operation.

When the signal TCF from the sender station is normally received, being followed by the recognition of the signals NSS and TSI, the CPU 1 commands the modem controller 5 that the signal CFR be sent out from the backward modem. After completion of the sending of the signal CFR, the coded image signal as received through the high-speed modem 6 is decoded to be thereafter sent to a recorder for being recorded therein.

What is claimed is:

1. A method for high-speed G3 facsimile communication, comprising steps of:
   establishing a transmission line between a sender station and a receiver station;
   sending from said sender station a procedure shortening signal as a low-speed modem signal before said receiver station can send out a CED signal, said procedure shortening signal being of a HDLC-frame structure, wherein areas FIF and FCF thereof contain predetermined bit arrays indicating a nonstandard command not based on the CCITT T30 and a data rate designating the transmission rate, respectively;
   sending out initial identification signals NSF and CSI from said receiver station in response to the reception of said procedure shortening signal; and
   sending out the control procedure signals TCF, TSI and NSS from said sender station as high-speed modem signals in response to the reception of said initial identification signals.

2. A method for high-speed G3 facsimile communication, comprising steps of:
  establishing a transmission line between a sender station and a receiver station;
  sending from said sender station a procedure shortening signal as a low-speed modem signal before said receiver station can send out a CED signal;
  sending out initial identification signals NSF and CSI, while inhibiting the sending out of the CED signal and a DIS signal, from said receiver station in response to the reception of said procedure shortening signal; and
  sending out the control procedure signals TCF, TSI and NSS from said sender station as high-speed modem signals in response to the reception of said initial identification signals in the absence of the CED and DIS signals.

3. A method according to claim 2, said procedure shortening signal being of a HDLC-frame structure, wherein areas FIF and FCF thereof contain predetermined bit arrays indicating a nonstandard command not based on the CCITT T30 and a data rate designating the transmission rate, respectively.

* * * * *